P. BRUNET.
PROCESS OF MAKING GLASS FACED TILES.
APPLICATION FILED OCT. 27, 1908.
1,025,677.
Patented May 7, 1912.
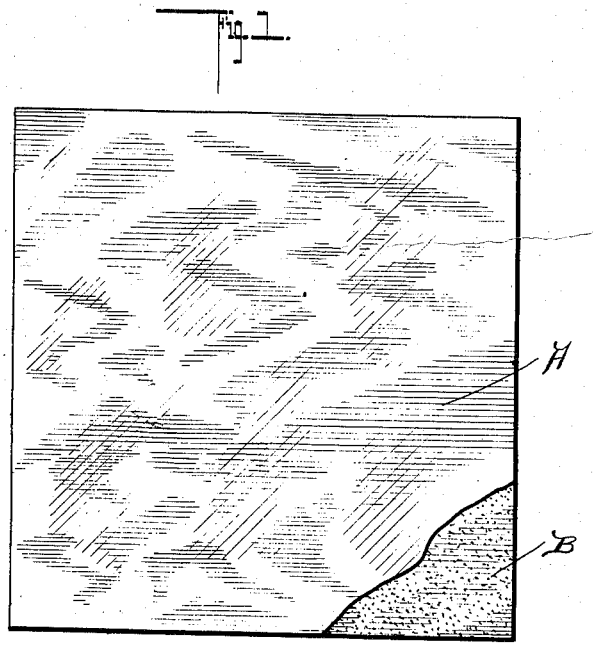
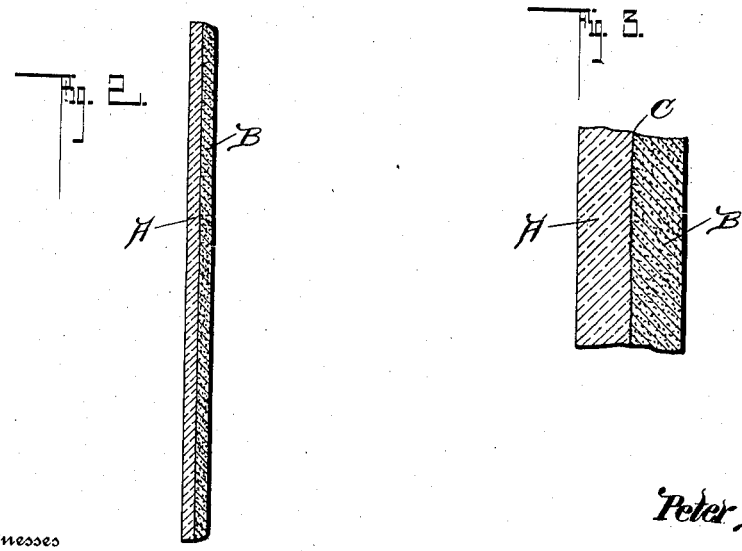
Witnesses
Philip H. Burch
Inventor
Peter Brunet
By Percy H. Moore
Attorney

UNITED STATES PATENT OFFICE.

PETER BRUNET, OF TORONTO, ONTARIO, CANADA.

PROCESS OF MAKING GLASS-FACED TILES.

1,025,677.     Specification of Letters Patent.     Patented May 7, 1912.

Application filed October 27, 1908. Serial No. 459,811.

*To all whom it may concern:*

Be it known that I, PETER BRUNET, a resident of Toronto, in the Province of Ontario, Canada, have invented certain new and useful Improvements in Processes of Making Glass-Faced Tiles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the manufacture of an artificial marble glass-faced tile, which is adapted to the various uses to which ordinary tiles or glazed bricks are now put, and the object thereof is to provide a composition of suitable ingredients which will closely adhere to the surface of glass.

I am aware that heretofore tiles have been constructed of glass having a backing of cement secured thereto, but great difficulty has been experienced in providing means which will cause the cement to adhere to the glass with any degree of security. To effect this desideratum, I slightly roughen the under side of the glass tiling by grinding, or other suitable method, and after treating the roughened surface with a bath of citric acid apply my improved mixture thereto.

In order that this invention may be readily understood, I will now proceed to describe the same with reference to the accompanying drawings, in which—

Figure 1, is a plan view of my improved tile having a portion of the glass broken away showing the cement backing. Fig. 2, is a vertical sectional view of Fig. 1. Fig. 3, is an enlarged sectional view more fully showing the roughened surface of the glass.

A represents the glass, C the ground surface thereof, and B the backing.

In making my adhesive backing, I use a composition consisting essentially of 85% Keene's cement, 10% water, 1% of albumen, 1% of gumarabic, 3% citric acid, and suitable dry coloring matter.

While it may be advisable under certain conditions to use albumen and gum arabic together with the other ingredients mentioned, I find that the two former may be dispensed with, without materially affecting the adhesive qualities of the mixture.

The use of citric acid ($H_3C_6H_5O_7$) has been found to be most effective in increasing the adhesive qualities of the backing and the acid may be applied directly to the roughened surface of the glass, as by means of a brush, or it may be mixed with the other ingredients of the backing.

It is obvious that my invention is applicable to building forms of various kinds such as, walls, cornices, moldings, etc.

Having now described my invention, what I claim and desire to secure by Letters Patent, is—

1. The process of making glass-faced tiles consisting of slightly roughening one surface of a plate of glass, and applying thereto a mixture of Keene's cement, water, dry coloring matter, albumen, gum arabic and citric acid.

2. The process of making glass-faced tiles consisting of grinding one surface of a plate of glass, and applying thereto a mixture of Keene's cement, dry coloring matter and citric acid.

3. The process of making artificial marble tiling consisting of slightly roughening one surface of a plate of glass, and applying thereto a mixture of Keene's cement 85%, water 10%, albumen 1%, gum arabic 1%, citric acid 3% and suitable dry coloring matter.

4. The process of making glass-faced tiles consisting of roughening one surface of a plate of glass, and applying thereto a mixture of Keene's cement, and citric acid.

5. As an article of manufacture a tile comprising a sheet of glass roughened on one surface and having applied thereto a composition consisting of a mixture of Keene's cement, water and dry coloring matter and citric acid as a binding agent for securing the backing to the glass.

PETER BRUNET.

Witnesses:
 WM. LAIDLAW,
 FLORENCE A. SWEET.